(12) United States Patent
Park et al.

(10) Patent No.: US 12,265,010 B2
(45) Date of Patent: Apr. 1, 2025

(54) PARTICLE MEASURING DEVICE

(71) Applicant: KOMICO LTD., Anseong-si (KR)

(72) Inventors: Si Young Park, Anseong-si (KR);
Seong Min Cho, Anseong-si (KR); Su Kyung Son, Anseong-si (KR)

(73) Assignee: KOMICO LTD., Anseong-si (KR)

(*) Notice: Subject to any disclaimer, the term of this patent is extended or adjusted under 35 U.S.C. 154(b) by 305 days.

(21) Appl. No.: 17/986,261

(22) Filed: Nov. 14, 2022

(65) Prior Publication Data

US 2023/0152201 A1  May 18, 2023

(30) Foreign Application Priority Data

Nov. 15, 2021 (KR) .................. 10-2021-0156750

(51) Int. Cl.
*G01N 15/10* (2024.01)
*G01N 1/02* (2006.01)
*G01N 15/00* (2024.01)
*G01N 15/06* (2024.01)

(52) U.S. Cl.
CPC ..... *G01N 15/10* (2013.01); *G01N 2015/0046* (2013.01); *G01N 2015/1024* (2024.01)

(58) Field of Classification Search
CPC ........... G01N 15/10; G01N 2015/0046; G01N 2015/1024; G01N 1/02; G01N 15/06; G01N 2001/028; A47L 9/02; A47L 9/00; A47L 5/28; B08B 5/02; B08B 5/04; B08B 3/02; B08B 9/023; B24B 55/06; B05B 1/005
See application file for complete search history.

(56) References Cited

U.S. PATENT DOCUMENTS

2018/0224475 A1* 8/2018 Browne .................. G01N 1/00

FOREIGN PATENT DOCUMENTS

| JP | 6515843 | 5/2019 |
|---|---|---|
| KR | 20160076183 A | 6/2016 |
| KR | 101793550 B1 | 11/2017 |

(Continued)

OTHER PUBLICATIONS

Korean Office Action with English translation for Korean Patent Application or Patent No. 10-2021-0156750, dated Mar. 3, 2022.

(Continued)

*Primary Examiner* — Eric S. McCall
*Assistant Examiner* — Anthony W Megna Fuentes
(74) *Attorney, Agent, or Firm* — Novick, Kim & Lee, PLLC; Jae Youn Kim

(57) ABSTRACT

A particle measuring device includes a probe including a nozzle spraying a gas on a surface of an object and an inlet inhaling the gas and particles scattered from the surface by the gas; a main pipe including an inflow hole through which the gas flows and a discharge hole through which the gas is discharged; a first manifold provided to connect the main pipe to the nozzle, and supplying the gas to the nozzle; a second manifold provided to connect the main pipe to the inlet between a connecting portion of the first manifold and the discharge hole, and supplying the particles and the gas to the main pipe; a third manifold branched from the second manifold and supplying the particles and the gas; and a particle counter connected to the third manifold, and counting the particles included in the gas supplied through the third manifold.

13 Claims, 1 Drawing Sheet

(56) References Cited

FOREIGN PATENT DOCUMENTS

| KR | 10-2020-0002792 | 1/2020 | | |
|---|---|---|---|---|
| KR | 20200059033 A | 5/2020 | | |
| KR | 10-2308875 | 10/2021 | | |
| KR | 102308875 B1 * | 10/2021 | ............. | G01N 15/10 |

OTHER PUBLICATIONS

KR Intellectual Property Office, Written Decision on Registration for Application No. 10-2021-0156750, Apr. 12, 2022.

* cited by examiner

PARTICLE MEASURING DEVICE

CROSS-REFERENCE TO RELATED APPLICATION(S)

This application claims priority under 35 USC § 119 to Korean Patent Applications No. 10-2021-0156750, filed on Nov. 15, 2021 in the Korean Intellectual Property Office (KIPO), the contents of which are incorporated herein in its entirety by reference.

BACKGROUND

1. Technical Field

Example embodiments relate generally to a particle measuring device. More particularly, the inventive concept uses a particle measuring device capable of measuring particles on a surface of an object.

2. Description of the Related Art

Generally, a particle measuring device measures particles disposed on a surface of an object such as a wafer. In the particle measuring device, a gas is sprayed on the surface using a pump, and particles and the gas, which are scattered from the surface, are inhaled from the surface to count the particles by a particle counter. That is, the spray and inhale are performed by the pump.

Particles generated by the operation of the pump may be supplied to the particle counter. Also, since outer gas inflows during the inhaling of the outer gas, particles included in the outer gas may be supplied to the particle counter. Therefore, the particle measuring device may not precisely count the particles on the surface.

SUMMARY

Some example embodiments provide a particle measuring device capable of precisely measuring particles on a surface of an object.

According to some example embodiments, a particle measuring device includes a probe including a nozzle spraying a gas toward a surface facing a surface of an object; and an inlet inhaling the gas and particles scattered from the surface by the gas, a main pipe including an inflow hole through which the gas flows and a discharge hole through which the gas is discharged, a first manifold provided to connect the main pipe to the nozzle, and being configured to supply the gas passing through the main pipe to the nozzle, a second manifold provided to connect the main pipe to the inlet between a connecting portion of the first manifold and the discharge hole, and being configured to supply the particles and the gas to the main pipe, a third manifold branched from the second manifold, and being configured to supply the particles and the gas, a particle counter connected to the third manifold, and being configured to count the particles included in the gas supplied through the third manifold, and an ejector provided on the connection portion where the main pipe and the second manifold are connected to each other, and being configured to inhale and transport the particles and the gas through the second manifold using a pressure energy of the gas passing through the main pipe.

In an example embodiment, the particle measuring device may further include a first flow control part provided on the first manifold to control a first flow rate of the gas passing through the first manifold, and a second flow control part provided on the second manifold to control a second flow rate of the gas passing through the second manifold.

Here, the first flow control part and the second flow control part may control a ratio of the first flow rate and the second flow rate to be in a range of about 1.3:1 to about 2.7:1 to prevent inflow of an outer gas through the inlet.

Further, the first flow control part and the second flow control part control a ratio of the first flow rate and the second flow rate to be in a range of about 1.7:1 to about 2.3:1, respectively, to prevent an outer gas from inflowing through the inlet.

In an example embodiment, the inlet may be disposed on a center of the surface, and the nozzle may be disposed in plurality to surround the inlet to prevent inflow of an outer gas through the inlet.

In an example embodiment, the surface may include a recess portion having a semi spherical shape on a central portion thereof such that the particles and the gas are to effectively inhaled through the inlet.

Here, the inlet may be disposed on a central portion of the recess portion, and the nozzle may be disposed in plurality to surround the inlet along the recessed portion. Further, the surface may further include a flat portion provided around the recess portion to face the surface of the object, and the nozzle may be arranged in plurality to spray a fluid at a constant distance.

Furthermore, the particle measuring device may further include a destatic part provided on the recess portion to irradiate an X-ray or an ultraviolet light onto the surface of the object to remove static electricity from the surface of the object and the particles such that the particles from the surface of the object are readily separated.

In an example embodiment, the particle measuring device may further include a distance sensor provided on the probe, and being configured to measure a distance toward the surface of the object, and when a distance sensed by the distance sensor is maintained within a reference distance, the probe sprays and inhales the gas and the particle counter measures the particles.

In an example embodiment, the particle measuring device may further include a filter provided on the main pipe between the inflow hole and the connecting portion of the first manifold, and being configured to remove particles included in the gas inflowing through the inflow hole.

In an example embodiment, the particle measuring device may further include a pump provided to be connected to the particle counter, and being configured to generate a suction force to supply the particles and the gas to the particle counter through the third manifold.

According to some example embodiments, a particle measuring device includes a probe including a nozzle spraying a gas toward a surface facing a surface of an object; and an inlet inhaling the gas and particles scattered from the surface by the gas, a main pipe including an inflow hole through which the gas flows and a discharge hole through which the gas is discharged, a first manifold provided to connect the main pipe to the nozzle, and being configured to supply the gas passing through the main pipe to the nozzle, a second manifold provided to connect the main pipe to the inlet between a connecting portion of the first manifold and the discharge hole, and being configured to supply the particles and the gas to the main pipe, a third manifold branched from the second manifold, and being configured to supply the particles and the gas, a particle counter connected to the third manifold, and being configured to count the particles included in the gas supplied through the third manifold, wherein the first manifold may be connected to the main pipe with being inclined to the main pipe, and the gas may be supplied from the main pipe to the nozzle through the first manifold by a pressure of the gas passing through the main pipe.

In an example embodiment, the particle measuring device may further include a first flow control part provided on the first manifold to control a first flow rate of the gas passing through the first manifold and a second flow control part provided on the second manifold to control a second flow rate of the gas passing through the second manifold.

In an example embodiment, the inlet may be disposed on a center of the surface, and the nozzle may be disposed in plurality to surround the inlet to prevent inflow of an outer gas through the inlet.

In an example embodiment, the surface may include a recess portion having a semi spherical shape on a central portion thereof such that the particles and the gas are to effectively inhale through the inlet.

Here, the inlet may be disposed on a central portion of the recess portion, and the nozzle may be disposed in plurality to surround the inlet along the recessed portion.

Further, the surface may further include a flat portion provided around the recess portion to face the surface of the object, and the nozzle is arranged in plurality to spray a fluid at a constant distance.

In an example embodiment, the particle measuring device may further include a destatic part provided on the recess portion to irradiate an X-ray or an ultraviolet light onto the surface of the object to remove static electricity from the surface of the object and the particles such that the particles from the surface of the object are readily separated.

In an example embodiment, the particle measuring device may further include a distance sensor provided on the probe, and being configured to measure a distance toward the surface of the object, and when a distance sensed by the distance sensor is maintained within a reference distance, the probe sprays and inhales the gas and the particle counter measures the particles.

According to the particle measuring device of the inventive concept, the gas may be sprayed by the pressure of the gas, and the gas may be inhaled by the ejector. The particles and the gas may be supplied to the particle counter by the pump. According to the operation of the pump, particles of the pump may not be supplied to the particle counter although the particles are generated by the operation of the pump. Thus, the particle measuring device may precisely measure the particles on the surface of the object.

A first flow rate of the gas flowing the first manifold and a second flow rate of the gas flowing the second manifold may be controlled, and an outer gas may be prevented from being inflowed through the inlet.

The inlet may be disposed on a center of the surface of the probe, and the nozzles may be disposed to surround the inlet in plural numbers. Thus, the outer gas may be prevented from being inflowed through the inlet.

Since the surface of the probe has a recess portion having a semi-spherical shape on a center thereof, the particles and the gas may be effectively inhaled through the inlet. Also, the surface may be provided around the recess portion. The surface may have a flat portion corresponding to the surface of the object and a nozzle spraying fluid at a constant distance. The outer gas may be prevented from being inflowed through the nozzle.

A static electricity on the surface of the object and the particles may be removed by the destatic part disposed on the recess portion. Therefore, the particles may be readily separated from the surface of the object.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
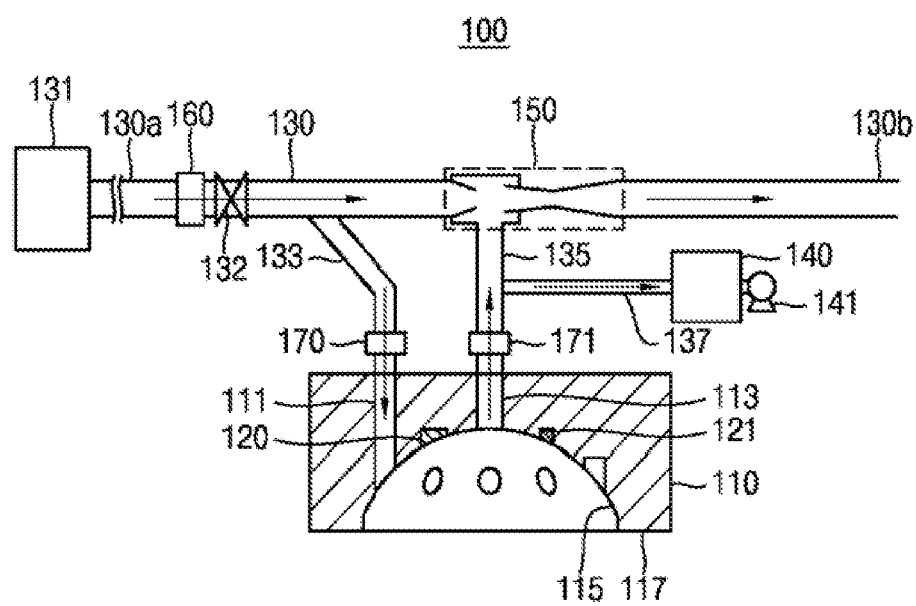
FIG. 1 is a side view illustrating a particle measuring according to an embodiment of the inventive concept.

Hereinafter, exemplary embodiments of the inventive concept will be described in detail with reference to the accompanying drawings. It will be understand that the inventive concept may be embodied in many alternative forms and should not be construed as limited to the example embodiments set forth herein. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In describing each drawing, like numerals are used for like elements. In the enclosed drawings, the sizes and relative sizes of layers and regions may be exaggerated for clarity. Like numerals refer to like elements throughout.

It will be understood that, although the terms first, second, etc. may be used herein to describe various elements, these elements should not be limited by these terms. These terms are used to distinguish one element from another. For example, a first element discussed below could be termed a second element without departing from the teachings of the present inventive concept. Also, a second element discussed below could be termed a first element without departing from the teachings of the present inventive concept.

The terms used in the inventive concept are only used to describe particular embodiments, and it is not intended to limit the inventive concept. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
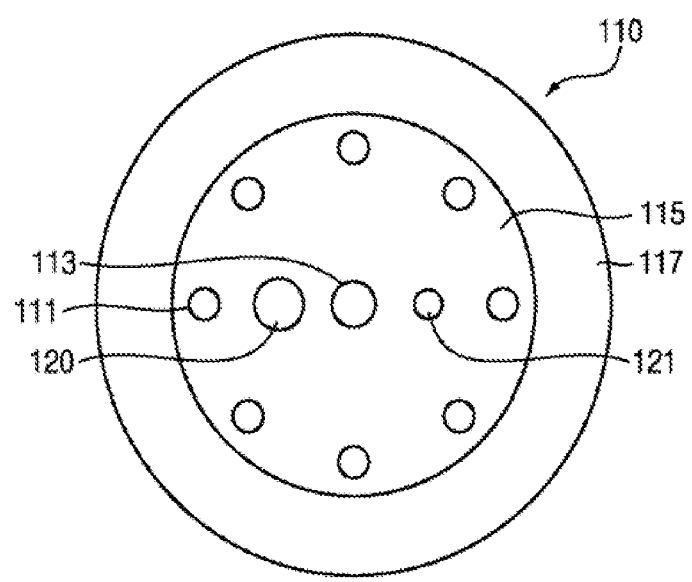
FIG. 2 is a bottom view illustrating a probe shown in FIG. 1.

FIG. 1 is a side view illustrating a particle measuring according to an embodiment of the inventive concept. FIG. 2 is a bottom view illustrating a probe shown in FIG. 1.

Referring to FIGS. 1 and 2, the particle measuring device 100 may include a probe 110, a destatic part 120 (or a static electricity removing part 120), a distance sensor 121, a main pipe 130, a first manifold 133, a second manifold 135, a third manifold 137, a particle counter 140, a pump 141, an ejector 150, a filter 160, a first flow control part 170, and a second flow control part 171.

The probe 110 may be configured to collect particles on a surface of an object (not illustrated). The probe 110 may be disposed to face the surface.

When the surface of the object is flat, the probe 110 may be in close contact with the surface. When the surface of the object is not flat, the probe 110 may be spaced apart from the surface.

The probe 110 may include nozzles 111 and inlets 113. The nozzles 111 and the inlets 113 may be disposed on a surface of the probe 110, which faces the surface (for example, the surface of the object).

The nozzles 111 may spray an gas on the surface of the object. The inlets 113 may inhale the gas and the particles sprayed from the surface by the gas.

When an air is used as the gas, reactive metal in the air may cause micropollution on the surface. An inert gas may be used as the gas to prevent the micropollution. Examples of the inert gas may include nitrogen gas, argon gas, helium gas, neon gas, etc.

The inlet 113 may be disposed on a center of the surface, and the nozzle 111 may be disposed on the surface to surround the inlet 113. Here, the number of the inlet 113 may be one. In another embodiment, the inlet 113 may be in plural. The gas sprayed from the nozzles 111 may block an outer gas, thereby preventing inflowing of the outer gas through the inlet 113.

The probe 110 may spray the gas onto the surface to scatter the particles, and inhale the gas and the particles inhaled from the surface. Thus, the particles may be collected.

The surface of the probe 110 may have a recess portion 115 having a substantially semispherical shape on a central portion thereof. The inlet 113 may be disposed on a center of the recess portion 115. The nozzles 111 may be disposed along an edge of the recess portion 115 to surround the inlet 113. Since the recess portion 115 performs a function of collecting the particles and the gas, the particles and the gas may be effectively inhaled by the inlet 113.

Also, the surface of the probe 110 may have a flat portion 117 provided along the recess portion 115. Also, nozzles may be arranged in plurality through the surface at a constant distance to discharge a fluid (for example, the gas). The fluid may be discharged through the nozzle. Thus, the flat portion 117 may prevent the inflow of the outer gas through the recess portion 117.

Since the probe 110 prevents the inflow of the outer gas to the recess portion 115 and the inlet 113, the inflow of particles by the outer gas may be prevented. Therefore, the particle measuring device 100 may precisely measure the particles on the surface of the object.

The destatic part 120 may be disposed on the probe 110, for example, on the recess portion 115. The destatic part 120 may irradiate an X-ray or an ultraviolet light on the surface of the object to remove a static charge of the surface of the object and the particles. The gas may be sprayed through the nozzles 111, and the particles may be readily separated from the surface of the object. Therefore, the particle measuring device 100 may precisely measure the particles on the surface of the object.

The distance sensor 121 may be provided on the probe 110, and measure a distance toward the surface of the object. When the distance measured by the distance sensor 121 is constantly maintained within a reference distance, the particle measuring device 100 may be automatically operated to measure the particles on the surface of the object. That is, the spraying and inhaling of the gas by the probe 110, and the measuring of the particles by the particle counter 140 may be performed. Therefore, pushing an additional start button may not be required to operate the particle measuring device 100.

In case that the particle measuring device 100 is slipped or dislocated along the surface of the object by a force pressing the start button, the credibility of the data measured by the particle measuring device 100 may be deteriorated.

When the distance sensor 121 is used, since the pressing of the start button is not required in the operation of the particle measuring device 100, the deterioration of the credibility of the data measured by the particle measuring device 100 may be prevented.

The main pipe 130 may be a path for moving the gas. The main pipe 130 may include an inflow hole 130a and a discharge hole 130b. The gas may flow into the main pipe 130 through the inflow hole 130a, and may be discharged through the discharge hole 130b.

The inflow hole 130a may be connected to a tank 131 configured to store the gas. The tank 131 may supply the gas to the inflow hole 130a at a constant pressure.

A valve 132 may be provided at a position adjacent to the inflow hole 130 and may open and close the main pipe 130. When the valve 132 is opened, the gas may move through the main pipe 130. When the valve 132 is closed, the movement of the gas through the main pipe 130 may stop.

When the particle measuring device 100 is operated by the start button or the distance sensor 121, the valve 132 may be opened. When the operation of the particle measuring device 100 stops, the valve 132 may be closed.

The first manifold 133 may be provided to connect the main pipe 130 to the nozzles 111, and provide the gas passing through the main pipe 130 to the nozzles 111.

For example, the first manifold 133 may be connected to the main pipe 130 and inclined with respect to the main pipe 130. The gas may be readily supplied to the nozzles 111 from the main pipe 130 through the first manifold 133 by the pressure of the gas passing through the main pipe 130.

Alternatively, the first manifold 133 may be connected to the main pipe 130 in perpendicular to the main pipe 130.

The gas supplied to the nozzles 111 through the first manifold 133 may be sprayed on the surface of the object and scatter the particles on the surface.

The second manifold 135 may be provided to connect the main pipe 130 to the inlet 113 between a connecting portion of the first manifold 133 (for example, a portion at which the first manifold 133 is connected to the main pipe 130) and the discharge hole 130b, and supply the particles and the gas to the main pipe 130.

The second manifold 135 may be connected to the main pipe 130 in perpendicular to the main pipe 130. A negative pressure may be formed in the second manifold 135 by the pressure of the gas passing through the main pipe 130. The particles and the gas may be supplied to the main pipe 130 by the negative pressure.

The third manifold 137 may be branched from the second manifold 135, and supply the particles and the air to the particle counter 140.

The particle counter 140 may be connected to the third manifold 137, and count the particles included in the gas supplied through the third manifold 137.

For example, the particle counter 140 may include a light emitting part and a light receiving part. The light emitting part may emit light. The light receiving part may be provided to correspond to the light emitting part, and measure light irradiated from the light emitting part and scattered by the particles to count the particles.

The pump 141 may be provided to be connected to the counter 140. The pump 141 may generate a suction force, and the particles and the gas may be supplied to the particle counter 140 through the third manifold 137. Therefore, the particles and the air passing through the third manifold 137 may be readily supplied to the particle counter 140.

Also, the pump 141 may be configured to supply the gas to the particle counter 140 at a predetermined reference flow rate. The reference flow rate may be a flow rate, at which the particle counter 140 may precisely count the particles.

The particles and the gas supplied to the particle counter 140 may pass through the pump and be discharged to the outside. Although particles are generated in the pump 141, the particles of the pump 141 may not be supplied to the particle counter 140 by the operation of the pump 141. Thus, the particles of the pump 141 may not affect the particle counting of the particle counter 140.

The ejector 150 may be provided at a connecting portion at which the main pipe 130 is connected to the second manifold 135. The ejector 150 may inhale and transport the particles and the gas through the second manifold 135 using the pressure of the gas passing through the main pipe 130. The probe 110 may readily inhale the particles and the gas through the inlet 113 by the suction force generated by the ejector 150.

The first flow control part 170 may be provided on the first manifold 133 and control a first flow rate of the gas passing through the first manifold 133. The first flow control part 170 may control the first flow rate, and the pressure of the gas sprayed from the nozzles 111 may be controlled. Therefore, the scattering degree of the particles on the surface of the object may be controlled.

The second flow control part 171 may be provided on the second manifold 135, and control a second flow rate of the gas passing through the second manifold 135. Since the second flow control part 171 controls the second flow rate, a suction pressure of the inlet 113 may be controlled.

In order to prevent the inflow of the outer gas through the inlet 113, the first flow rate may, preferably, be greater than the second flow rate. Therefore, the first flow control part 170 and the second flow control part 171 may control the first flow rate to be greater than the second flow rate. For example, a ratio of the first flow rate to the second flow rate may be in a range of about 1.3:1 to about 2.7:1, preferably, in a range of about 1.7:1 to about 2.3:1.

In particular, in order to improve the precision of a corresponding ratio of the flow rates, a process of calibration may be performed in the operation of the device through automated control of the flow rates.

The filter 160 may be provided on a connecting portion of the main pipe 130 between the inflow hole 130a and the first manifold 133, and remove particles included in the gas which flow through the inflow hole 130a. The filter 160 may collect particles having a size greater than a certain size, and pass through particles having a size smaller than the certain size. Here, the certain size may be about 3 nm.

In the particle measuring device 100, the gas may be sprayed to the surface of the object by the pressure of the gas, the gas may be inhaled by the ejector 150, and the particles and the gas may be supplied to the particle counter 140 by the pump 141. Particles generated by the operation of the pump 141 may not supplied to the particle counter 140. Also, the probe 110 may prevent the inflow of the outer gas. Since additional particles are not generated or inflowed until the particles are supplied to the particle counter 140, the particle measuring device 100 may precisely measure the particles on the surface of the object.

According to the above-described, the particle measuring device according to the inventive concept may prevent the generation of internal particles and the inflow of the particles from the outside to precisely measure the particles on the surface of the object. Therefore, credibility of the particle measuring device may be improved.

Although preferred embodiments of the inventive concept have been disclosed for illustrative purposes, those skilled in the art will appreciate that various modifications, additions and substitutions are possible, without departing from the scope and spirit of the disclosure as disclosed in the accompanying claims and their equivalents.

What is claimed is:

1. A particle measuring device, comprising: a probe including: a nozzle configured to spray a gas toward a surface of an object; and an inlet configured to inhale the gas and particles scattered from the surface by the gas; a main pipe including: an inflow hole through which the gas flows; and a discharge hole through which the gas is discharged; a first manifold provided to connect the main pipe to the nozzle, and being configured to supply the gas passing through the main pipe to the nozzle; a second manifold provided to connect the main pipe to the inlet between a connecting portion of the first manifold and the discharge hole, and being configured to supply the particles and the gas to the main pipe; a third manifold branched from the second manifold, and being configured to supply the particles and the gas; a particle counter connected to the third manifold, and being configured to count the particles included in the gas supplied through the third manifold; and an ejector provided on a connection portion where the main pipe and the second manifold are connected to each other, and being configured to inhale and transport the particle sand the gas through the second manifold using a pressure energy of the gas passing through the main pipe.

2. The particle measuring device of claim 1, further comprising:
a first flow control part provided on the first manifold to control a first flow rate of the gas passing through the first manifold; and
a second flow control part provided on the second manifold to control a second flow rate of the gas passing through the second manifold.

3. The particle measuring device of claim 2, wherein the first flow control part and the second flow control part control a ratio of the first flow rate and the second flow rate to be in a range of 1.3:1 to 2.7:1 to prevent inflow of an outer gas through the inlet.

4. The particle measuring device of claim 2, wherein the first flow control part and the second flow control part control a ratio of the first flow rate and the second flow rate to be in a range of 1.7:1 to 2.3:1, respectively, to prevent an outer gas from inflowing through the inlet.

5. The particle measuring device of claim 1, wherein the inlet is disposed on a center of the probe, and the nozzle is disposed in plurality to surround the inlet to prevent inflow of an outer gas through the inlet.

6. The particle measuring device of claim 1, wherein the probe includes a recess portion having a semi spherical shape on a central portion thereof such that the particles and the gas are to effectively inhale through the inlet.

7. The particle measuring device of claim 6, wherein the inlet is disposed on a central portion of the recess portion, and the nozzle is disposed in plurality to surround the inlet along the recessed portion.

8. The particle measuring device of claim 6, wherein the probe further includes a flat portion provided around the recess portion to face the surface of the object, and the nozzle is arranged in plurality to spray a fluid at a constant distance.

9. The particle measuring device of claim 6, further comprising a destatic part provided on the recess portion to irradiate an X-ray or an ultraviolet light onto the surface of the object to remove static electricity from the surface of the object and the particles such that the particles from the surface of the object are readily separated.

10. The particle measuring device of claim 1, further comprising a distance sensor provided on the probe, and being configured to measure a distance toward the surface of the object, and
when a distance sensed by the distance sensor is maintained within a reference distance, the probe sprays and inhales the gas and the particle counter measures the particles.

11. The particle measuring device of claim 1, further comprising a filter provided on the main pipe between the inflow hole and the connecting portion of the first manifold, and being configured to remove particles included in the gas inflowing through the inflow hole.

12. The particle measuring device of claim 1, further comprising a pump provided to be connected to the particle counter, and being configured to generate a suction force to supply the particles and the gas to the particle counter through the third manifold.

13. The particle measuring device of claim 1,
wherein the first manifold is connected to the main pipe with being inclined to the main pipe, and the gas is supplied from the main pipe to the nozzle through the first manifold by a pressure of the gas passing through the main pipe.

* * * * *